(12) United States Patent
Mildh

(10) Patent No.: US 11,134,489 B2
(45) Date of Patent: Sep. 28, 2021

(54) FREQUENCY OR RADIO ACCESS TECHNOLOGY (RAT) SELECTION BASED ON SLICE AVAILABILITY

(71) Applicant: Telefonaktiebolaget LM Ericsson (publ), Stockholm (SE)

(72) Inventor: Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/650,491

(22) PCT Filed: Sep. 28, 2018

(86) PCT No.: PCT/IB2018/057587
§ 371 (c)(1),
(2) Date: Mar. 25, 2020

(87) PCT Pub. No.: WO2019/064274
PCT Pub. Date: Apr. 4, 2019

(65) Prior Publication Data
US 2020/0337050 A1 Oct. 22, 2020

Related U.S. Application Data

(60) Provisional application No. 62/565,022, filed on Sep. 28, 2017.

(51) Int. Cl.
*H04W 72/04* (2009.01)
*H04W 72/10* (2009.01)

(52) U.S. Cl.
CPC ....... *H04W 72/0453* (2013.01); *H04W 72/10* (2013.01)

(58) Field of Classification Search
CPC ............ H04W 72/0453; H04W 72/10; H04W 88/10; H04W 48/08
See application file for complete search history.

(56) References Cited

U.S. PATENT DOCUMENTS

2017/0257886 A1 9/2017 Adjakple et al.
2019/0174571 A1* 6/2019 Deenoo ................ H04W 76/11
(Continued)

FOREIGN PATENT DOCUMENTS

CN 106879009 A 6/2017
EP 1214818 A1 6/2002
(Continued)

OTHER PUBLICATIONS

Author Unknown, "Technical Specification Group Services and System Aspects; Study on Architecture for Next Generation System (Release 14)," Technical Report 23.799, Version 14.0.0, 3GPP Organizational Partners, Dec. 2016, 522 pages.
(Continued)

*Primary Examiner* — Diane D Mizrahi
(74) *Attorney, Agent, or Firm* — Withrow & Terranova, PLLC

(57) ABSTRACT

Embodiments of the present disclosure relate to frequency or RAT selection based on slice availability. In one aspect, a core network function is provided for determining information for RAT and/or frequency selection based on knowledge of network slices and providing that information to a RAN node, which may provide that information to a UE. The information may be a RFSP index or other index parameter, which may be set based on subscription related information or other information. Slice knowledge may include knowledge of availability of network slices at the network, active slices for the UE, slices to which the UE is registered or connected, and/or slices to which the UE is allowed access. In another aspect, a RAN node performs mapping to mobility policies for UE active or idle mobility based on the determined information along with slice or subscription information provided by a CN node.

16 Claims, 11 Drawing Sheets

(56) References Cited

U.S. PATENT DOCUMENTS

| | | | | |
|---|---|---|---|---|
| 2020/0229069 A1* | 7/2020 | Chun | ............... | H04W 36/0079 |
| 2020/0245235 A1* | 7/2020 | Chun | ................... | H04W 48/18 |

FOREIGN PATENT DOCUMENTS

| | | | |
|---|---|---|---|
| WO | 2014052750 | A2 | 4/2014 |
| WO | 2017074486 | A1 | 5/2017 |
| WO | 2017086646 | A1 | 5/2017 |
| WO | 2017135860 | A1 | 8/2017 |
| WO | 2017140342 | A1 | 8/2017 |
| WO | 2017157119 | A1 | 9/2017 |

OTHER PUBLICATIONS

Author Unknown, "Technical Specification Group Services and System Aspects; System Architecture for the 5G System; Stage 2 (Release 15)," Technical Specification 23.501, Version 1.4.0, 3GPP Organizational Partners, Sep. 2017, 151 pages.

Author Unknown, "Technical Specification Group Services and System Aspects; System Architecture for the 5G System; Stage 2 (Release 15)," Technical Specification 23.501, Version 15.2.0, 3GPP Organizational Partners, Jun. 2018, 217 pages.

Author Unknown, "Technical Specification Group Services and System Aspects; Procedures for the 5G System; Stage 2 (Release 15)," Technical Specification 23.502, Version 1.2.0, 3GPP Organizational Partners, Sep. 2017, 165 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Technical Specification 36.300, Version 14.4.0, 3GPP Organizational Partners, Sep. 2017, 329 pages.

Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.4.0, 3GPP Organizational Partners, Sep. 2017, 753 pages.

Author Unknown, "Technical Specification Group Radio Access Network; Evolved Universal Terrestrial Radio Access Network (E-UTRAN); S1 Application Protocol (S1AP) (Release 14)," Technical Specification 36.413, Version 14.3.0, 3GPP Organizational Partners, Jun. 2017, 347 pages.

Author Unknown, "Technical Specification Group Radio Access Network; NG Radio Access Network (NG-RAN); NG Application Protocol (NGAP) (Release 15)," Technical Specification 38.413, Version 0.3.0, 3GPP Organizational Partners, Aug. 2017, 85 pages.

De Foy, Xavier, et al., "Network Slicing—3GPP Use Case," Internet Engineering Task Force (IETF), Network Working Group, Internet-Draft, Mar. 6, 2017, 15 pages.

Ericsson, "R2-1707799: Slice availability," Third Generation Partnership Project (3GPP), TSG-RAN WG2 #99, Aug. 21-25, 2017, 5 pages, Berlin, Germany.

ETSI MCC, "R2-1804201: Report of 3GPP TSG RAN2#101 meeting, Athens, Greece," Third Generation Partnership Project (3GPP), TSG-RAN WG2 meeting #101, Apr. 16-20, 2018, 250 pages, Sanya, China.

Oppo, "R2-1708038: Discussion on Several Issues for Network Slicing," Third Generation Partnership Project (3GPP), TSG-RAN WG2#99, Aug. 22-26, 2017, 3 pages, Berlin, Germany.

Qualcomm Incorporated, "S2-176721: TS 23.501: Idle camping priority for voice," Third Generation Partnership Project (3GPP), SA WG2 Meeting #122bis, Aug. 21-25, 2017, 2 pages, Sophia Antipolis, France.

RAN2, "R2-1804095: LS regarding RAN support for NW slicing," Third Generation Partnership Project (3GPP), TSG-RAN WG2 Meeting #101, Feb. 26-Mar. 2, 2018, 1 page, Athens, Greece.

Xiaomi (Rapporteur), "R2-1709158: Report of email discussion: [97bis#14][NR] Slicing," Third Generation Partnership Project (3GPP), TSG-RAN2 #99, Aug. 21-25, 2017, 37 pages, Berlin, Germany.

Vivo "R2-1706961: Consideration for additional QoS parameter," Third Generation Partnership Project (3GPP), TSG RAN WG2 NR Ad Hoc, Jun. 27-29, 2017, 3 pages, Qingdao, China.

International Search Report and Written Opinion for International Patent Application No. PCT/IB2018/057587, dated Jan. 2, 2019, 17 pages.

Written Opinion for International Patent Application No. PCT/IB2018/057587, dated Aug. 23, 2019, 8 pages.

International Preliminary Report on Patentability for International Patent Application No. PCT/IB2018/057587, dated Mar. 10, 2020, 25 pages.

Ericsson, "Tdoc R2-1706325: Slice availability," 3GPP TSG-RAN WG2 #98-AH, Jun. 27-29, 2017, Qingdao, Chna, 5 pages.

Qualcomm Incorporated, "S2-174460: TS 23.502: Idle camping priority for voice and fallback to E-UTRA procedures,", 3GPP SA WG2 Meeting #122, Jun. 26-30, 2017, San Jose Del Cabo, Mexico, 9 pages.

Xiaomi (Rapporteur), "R2-1706871: Report of email discussion: [97bis#14][NR] Slicing," 3GPP TSG-RAN NR #2, Jun. 27-29, 2017, Qingdao, China, 37 pages.

First Office Action for Chinese Patent Application No. 201880063103.9, dated Jul. 22, 2021, 17 pages.

Notice of Reasons for Refusal for Japanese Patent Application No. 2020-515199, dated Jul. 30, 2021, 6 pages.

* cited by examiner

Network Slicing Conceptual Outline

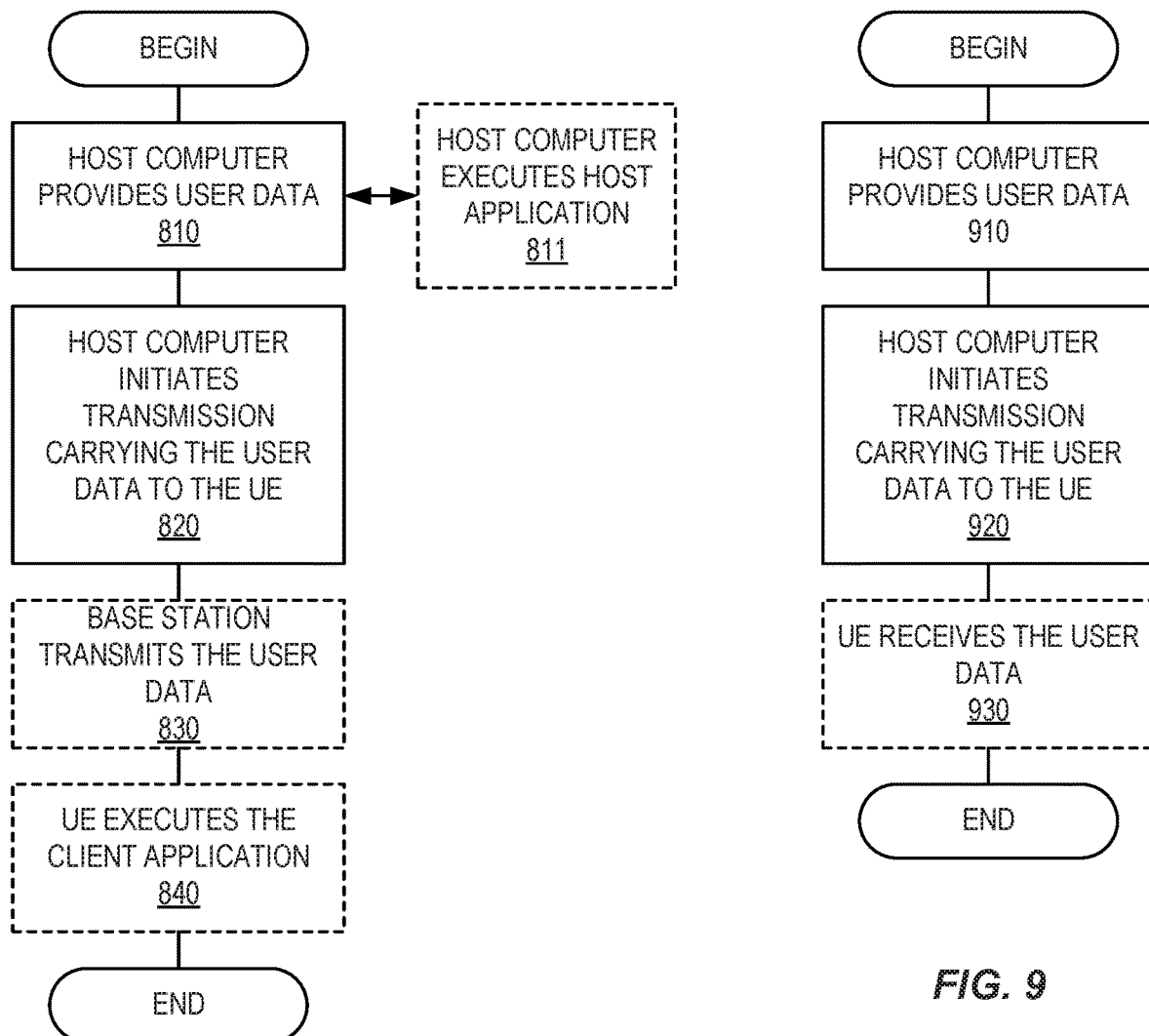

FREQUENCY OR RADIO ACCESS TECHNOLOGY (RAT) SELECTION BASED ON SLICE AVAILABILITY

RELATED APPLICATIONS

This application is a 35 U.S.C. § 371 national phase filing of International Application No. PCT/IB2018/057587, now published as International Publication No. WO 2019/064274 A1, filed Sep. 28, 2018, which claims the benefit of provisional patent application Ser. No. 62/565,022, filed Sep. 28, 2017, the disclosures of which are hereby incorporated herein by reference in their entireties.

TECHNICAL FIELD

Fifth Generation (5G), 5G Core Network (5GC), New Radio (NR), Next Generation (NG), Authentication Management Function (AMF), Network Slicing

BACKGROUND

It has been agreed in Third Generation Partnership Project (3GPP) to support network slicing for Fifth Generation (5G) Core Network (5GC) and for Next Generation (NG) Radio Access Network (RAN) which includes both Long Term Evolution (LTE) and New Radio (NR) Radio Access Technology (RAT). The following terms are used herein:

Service: a service provided to entities on the telecommunication network. Example services include end-user services and business services. Services can be provided by the network operator or by third parties.

Service Instance: an instantiation of a service on the telecommunication network. A network may have zero or more service instances, which may be of different types, the same type, or some of the above.

Network Slice: a complete logical network providing telecommunication services and network capabilities, including Access Network (AN) and Core Network (CN) capabilities. An AN can be common to multiple network slices. Network slices may support different features and/or may have different network functions optimizations.

Network Slice Instance (NSI): a set of network functions, and resources to run these network functions, forming a complete instantiated logical network to meet certain network characteristics required by one or more service instances. A NSI may be fully or partially, logically and/or physically isolated from another NSI. The resources include physical and logical resources. A NSI may be comprised of sub-network instances, which may be shared by multiple NSIs. A NSI may be defined by a network slice blueprint. Instance-specific policies and configurations are required when creating a NSI. Example network characteristics include but are not limited to ultra-low-latency, ultra-reliability, etc.

Network Slice Selection Assistance Information (NSSAI): information consisting of a set of parameters provided by a User Equipment (UE) to the network to select the set of RAN and CN part of the NSIs for the UE. This information includes, for each slice the UE is allowed to access, a Slice Service Type (SST) and may include a Slice Differentiator (SD).

RAT/Frequency Selection Priority (RFSP) Index: mapped by the RAN to a locally-defined configuration in order to apply specific Radio Resource Management (RRM) strategies. The RFSP Index may be used by the RAN to derive UE-specific cell reselection priorities to control idle mode camping and to decide on redirecting active mode UEs to different frequency layers or RATs. The RFSP Index is UE-specific and applies to all radio bearers.

Network slicing is for instance described in 3GPP Technical Specification (TS) 23.799. Network slicing enables the operator to create networks customized to provide optimized solutions for different market scenarios which demands diverse requirements, e.g., in the areas of functionality, performance and isolation.

FIG. 1 illustrates the network slicing concept. As depicted in FIG. 1, the network slicing concept consists of 3 layers: 1) a service instance layer 110, 2) a NSI Layer 112, and 3) a resource layer 114.

The service instance layer 110 represents the services (end-user service or business services) which are to be supported. Each service is represented by a service instance 116. In the embodiment illustrated in FIG. 1, there are five service instances labelled 116-1 through 116-5, which may be collectively or individually referred to as a service instance 116. Typically services can be provided by the network operator or by third parties. In line with this, a service instance 116 can either represent an operator service or a third party provided service.

A network operator uses a network slice blueprint to create a NSI 118. In the embodiment illustrated in FIG. 1, there are four NSIs labelled 118-1 through 118-4, which may be collectively or individually referred to as a NSI 118. A NSI 118 provides the network characteristics which are required by a service instance 116. A NSI 118 may also be shared across multiple service instances 116 provided by the network operator. Whether there is a need to support sharing of NSIs 118 across the service instances 116 provided by different third parties has not yet been standardized.

The NSI 118 may be composed by none, one, or more sub-network instances 120. In the embodiment illustrated in FIG. 1, there are six sub-network instances, labelled 120-1 through 120-6, which may be collectively or individually referred to as a sub-network instance 120, which may be shared by another NSI 118. In the embodiment illustrated in FIG. 1, for example, sub-network instance 120-4 is shared by NSI 118-3 and NSI 118-4. Similarly, the sub-network blueprint is used to create a sub-network instance 120 to form a set of network functions, which run on physical/logical resources 122.

NSI 118: a set of network functions and resources 122 to run these network functions, forming a complete instantiated logical network to meet certain network characteristics required by the service instance(s) 116, such as:

A NSI 118 may be fully or partly, logically and/or physically, isolated from another NSI 118.

The resources 122 comprise physical and logical resources; a NSI 118 may be composed of sub-network instances 120, which as a special case may be shared by multiple NSIs 118. The NSI 118 is defined by a network slice blueprint.

Instance-specific policies and configurations are required when creating a NSI 118.

Network characteristics examples are ultra-low-latency, ultra-reliability, etc.

The following list includes the current status of agreements on the network slicing:

The network slice is a complete logical network (providing telecommunication services and network capabilities) including AN and CN components. Whether a RAN is sliced is up to 3GPP RAN Working Groups (WGs) to determine. AN can be common to multiple NSIs 118. NSIs 118 may differ for features supported and network functions optimization use cases. Networks may deploy multiple NSIs 118 delivering exactly the same optimizations and features as per but dedicated to different groups of UEs, e.g., as they deliver a different committed service and/or because they may be dedicated to a customer.

A UE may provide NSSAI consisting of a set of parameters to the network to select the set of RAN and CN part of the NSIs 118 for the UE.

If a network deploys network slicing, then it may use UE provided NSSAI to select a network slice. In addition, the UE capabilities and UE subscription data may be used.

A UE may access multiple slices simultaneously via a single RAN. In such case, those slices share some control plane functions, such as an Authentication Management Function (AMF) and a NSI Selection Function (NSISF). These common functions are collectively identified as Common Control Network Functions (CCNFs).

The CN part of NSI(s) serving a UE is selected by CN, not RAN.

The UE may cause the network to change the set of network slices it is using by submitting in a Mobility Management (MM) procedure the value of a new NSSAI. The final decision is up to the network.

The network, based on local policies, subscription changes, and/or UE mobility, can change the set of network slices that are being used by a UE by providing the UE a notification of accepted NSSAI change. This then triggers a UE initiated MM procedure including in Radio Resource Control (RRC) and Non-Access Stratum (NAS) signalling the new value of the new accepted NSSAI the network has provided.

A change of the set of slices used by a UE (whether UE or network initiated), may lead to CCNF change subject to operator policy. The scenarios, as well as which MM procedures to use when such UE triggered network slice change is to be used, are to be determined during normative phase. Changing the set of network slices accessible by the UE will result in termination ongoing Protocol Data Unit (PDU) sessions with the original set of network slices if these slices are no longer used (some slices are still retained, potentially).

The Network subscription data includes information about what slices a UE is allowed to access. The Information in the subscription includes both SST and SD information for each slice the UE is allowed to access (SD information is present if applicable for a slice). This is also the Session Management-NSSAI (SM-NSSAI) for the slice. The subscription data include information on whether a slice is a default slice (i.e., the UE shall be using this slice when it is attached to the network). When a UE is initially attached to the network without providing any NSSAI, the CN should use a default NSSAI, composed of the SM-NSSAI values stored in the UE subscription with a flag indication they are to be considered default slices, to determine the default initial network slice(s) to serve the UE.

Additionally it has been agreed in 3GPP TS 23.501 that the set of network slices for a UE can be changed at any time while the UE is registered with a network, and may be initiated by the network, or the UE under certain conditions as described below. In this release of the specification it is assumed that the registration area allocated by the AMF to the UE shall have homogeneous support for network slices.

As can be seen from the agreement above, the UE will be allocated registration areas. A registration area contains a set of Tracking Areas (TAs) made up of one or more cell. The whole registration area should support the network slices that the UE is connected to. This means that the same slices are supported by all the cells of the UE registration area.

At the 3GPP RAN2 #99 meeting, the topic of how to handle UE cell and frequency selection in relation to slicing was discussed. Below are excerpts from the meeting report R2-1709158:

P2a:
  According to the 3GPP SA2 group, the maximum number of slices per UE is 8.
Agreements:
  RAN2 understand that a network slice has a RAN part and a CN part. There is no concept of a RAN slice separate from the network slice
  RAN2 targets that RAN solutions for network slicing should be able to support a large number of slices (e.g., hundreds of slices). Number of slices supported by UE in parallel is 8.
  From UE perspective, the UE can be configured to support the requirements of the supported slices (e.g., by appropriate configuration of different Data Radio Bearers (DRBs) of different PDU sessions).
  For intra-frequency cell reselection the UE try to always camp on the best cell.
  We will not support additional functionality for Random Access Channel (RACH) resource isolation/differentiated treatment for slicing for 3GPP Release (Rel-) 15,
Working assumption(s):
  For needs of slicing, appropriate configuration of the dedicated priorities provided from the New Radio Base Station (gNB) can be used to control the frequency on which the UE camps. (I.e., reuse of same mechanism as in LTE). (To be checked whether the gNB has knowledge of all the slices to which the UE is registered)
The background for the discussion above was the topic on that different cells or frequency layers may have different support for network slicing. The issue is then: "How does the UE which is registered to a slice select that frequency or cell that support that slice?" This topic was for instance discussed in the Ericsson contribution R2-1707799, Slice Availability Ericsson, which was submitted to the meeting. Below are excerpts from R2-1707799:
  As understood by 3GPP TS groups SA2/RAN3, all slices are not expected to be available in the whole network; however, the slice availability will be consistent across the UE registration area. This means if a slice is available in one NR or LTE cell, it is at least available in all cells belonging to the same CN tracking area. This means that any changes to slice availability can be handled when the UE perform a CN level registration area change. This is also the current understanding in 3GPP TS 23.501, section 5.15, where availability and connectivity to slices is handled on a NAS level.
  An open issue for RAN2 to address is if slice availability should be provided to the UE, and if so, then how slice availability should be provided to the UE.
  The following main arguments are made why slice availability should not be explicitly provided as part of system information but rather be handled between UE and CN (using NAS signaling):
    Scalability. It would be beneficial if the solution allows adding hundreds of slices in the future, using broadcast would not scale to these levels due to unnecessary overhead.

Future proofness. New slices, slice types, or characteristics might be added in the future, leading to future updates. For this reason, it is clearly beneficial to rely on dedicated signaling to handle slice availability making it easier to add new features in the future only impacting UEs and network that support these features.

Optimization. Lack of knowledge in RAN and UE about subscription, service and slice information, leading to sub-optimal cell/RAT/frequency selection. Broadcasting slice availability could lead to that UE selects sub-optimal cell to camp on, when it could, based on subscription information or operator policies available in the CN receive service from a different slice with similar performance as the original slice.

Consistent UE behavior. Broadcasting slice availability assumes that UE controls the RAT/frequency/cell selection by itself using this information. This could lead to inconsistent UE behavior, making it difficult for the operator to introduce new features, frequency layers, etc. It is better if existing slice agnostic network controlled RAT/frequency/cell mechanisms are reused also to handle slice availability based on operator polices.

In the meeting, the principle to use dedicated priorities was adopted. Portions from the minutes taken from the meeting above are shown below:

Open issues that were identified include how the gNB should have knowledge about the slices so it can assign the UE frequency (and RAT) priorities.

In 3GPP TS 23.501: Radio Resource Management Functions, there has also been work to define the RFSP. Below are excerpts from 3GPP TS 23.501:

To support radio resource management in RAN the AMF provides the parameter 'Index to RAT/Frequency Selection Priority' (RFSP Index) to RAN across N2.

The RFSP Index is mapped by the RAN to locally defined configuration in order to apply specific RRM strategies.

The RFSP Index is UE-specific and applies to all the Radio Bearers.

Examples of how this parameter may be used by the RAN:

To derive UE-specific cell reselection priorities to control idle mode camping.

To decide on redirecting active mode UEs to different frequency layers or RATs.

The AMF receives the subscribed RFSP Index (e.g., during the Registration procedure). For non-roaming subscribers, the AMF chooses the RFSP Index in use according to one of the following procedures, depending on operator's configuration:

the RFSP Index in use is identical to the subscribed RFSP Index, or the AMF chooses the RFSP Index in use based on the subscribed RFSP Index, the locally configured operator's policies and the UE related context information available at the AMF, including UE's usage setting, if received during Registration procedures (see clause 3GPP TS 23.502).

One example of how the AMF can use the "UE's usage setting," is to select an RFSP value that enforces idle mode camping on Evolved Universal Terrestrial Radio Access (E-UTRA) for a UE acting in a "Voice centric" way, in case voice over NR is not supported in the specific Registration Area and it contains NR cells.

For roaming subscribers the AMF may alternatively choose the RFSP Index in use based on the visited network policy, but can take input from the Home Public Land Mobile Network (HPLMN) into account (e.g., an RFSP Index value pre-configured per HPLMN, or a single RFSP Index value to be used for all roamers independent of the HPLMN).

The RFSP Index in use is also forwarded from source to target RAN node when Xn or N2 is used for intra-NG RAN handover.

The AMF stores the subscribed RFSP Index value received and the RFSP Index value in use. During the Registration Update procedure, the AMF may update the RFSP Index value in use (e.g., the AMF may need to update the RFSP Index value in use if the UE related context information in the AMF has changed). When the RFSP Index value in use is changed, the AMF immediately provides the updated RFSP Index value in use to NG RAN node by modifying an existing UE context or by establishing a new UE context in RAN or by being configured to include the updated RFSP Index value in use in the DOWNLINK NAS TRANSPORT message if the user plane establishment is not needed. During inter-AMF mobility procedures, the source AMF forwards both RFSP Index values to the target AMF. The target AMF may replace the received RFSP Index value in use with a new RFSP Index value in use that is based on the operator's policies and the UE related context information available at the target AMF.

Problems with Existing Solutions

One problem with existing solutions is that the gNB has no knowledge of all the slices to which the UE is registered, yet the gNB needs to know this information in order to assign dedicated priorities to the UE, which can be used to control the frequency on which the UE camps on, in scenarios where not all frequency bands support the same slices.

Put another way, the problem is how to assign dedicated priorities to the UE which can be used to control the cell, frequency and RAT on which the UE camps or communicates on in scenarios where not all frequency bands or RATs support the same slices.

SUMMARY

To address the problem above, the following solutions are presented.

According to one aspect, a core network (CN) node is configured to communicate with a Radio Access Network (RAN) node, the CN node comprising processing circuitry configured to: determine information for Radio Access Technology (RAT) and/or frequency selection; and send the determined information to the RAN node; wherein at least one of: the processing circuitry is further configured to determine the determined information based on knowledge of network slices; or the processing circuitry is further configured to send the knowledge of network slices to the RAN node along with the determined information.

In some embodiments, the CN node comprises one of an Authentication Management Function (AMF) a Session Management Function (SMF) a Mobility Management Entity (MME) or a Home Subscriber Server (HSS).

In some embodiments, the knowledge of network slices comprises knowledge of: availability of network slices at the network; active slices for the UE; slices to which the UE is registered or connected; and/or slices to which the UE is allowed access based on subscription information.

In some embodiments, the information for RAT and/or frequency selection comprises an index parameter.

In some embodiments, the index parameter comprises a RAT and/or Frequency Selection Priority (RFSP) index.

In some embodiments, the knowledge of network slices is provided to the CN from a User Equipment (UE), a RAN node, or other node.

In some embodiments, the information for RAT and/or frequency selection comprises information used to control a frequency on which a UE camps.

In some embodiments, the information for RAT and/or frequency selection comprises information used to configure frequency priorities for idle mode reselection.

According to another aspect, a method is implemented in a CN node, the method comprising: determining information for RAT and/or frequency selection; and sending the determined information to a RAN node; wherein at least one of: determining the information comprises determining the information based on knowledge of network slices; or sending the determined information further comprises sending the knowledge of network slices to the RAN node along with the determined information.

In some embodiments, the CN node comprises one of an AMF, a SMF, a MME, or a HSS.

In some embodiments, the knowledge of network slices comprises knowledge of: availability of network slices at the network; active slices for the UE; slices to which the UE is registered or connected; and/or slices to which the UE is allowed access based on subscription information.

In some embodiments, the information for RAT and/or frequency selection comprises an index parameter.

In some embodiments, the index parameter comprises a RFSP index.

In some embodiments, the knowledge of network slices is provided to the CN from a UE, a RAN node, or other node.

In some embodiments, the information for RAT and/or frequency selection comprises information used to control a frequency on which a UE camps.

In some embodiments, the information for RAT and/or frequency selection comprises information used to configure frequency priorities for idle mode reselection.

According to another aspect, a RAN node is configured to communicate with a UE, the RAN node comprising: a radio interface; and processing circuitry configured to: receive information for RAT and/or frequency selection; use the received information to determine UE-specific cell reselection priorities to control idle mode camping and/or active mode mobility; and provide the UE-specific cell reselection priorities to the UE; wherein at least one of: the received information for RAT and/or frequency selection was determined based on knowledge of network slices; or the received information for RAT and/or frequency selection further comprises the knowledge of network slices and wherein the processing circuitry is further configured to use the knowledge of network slices while determining the UE-specific cell reselection priorities.

1 In some embodiments, the knowledge of network slices comprises knowledge of: availability of network slices at the network; active slices for the UE; slices to which the UE is registered or connected; and/or slices to which the UE is allowed access based on subscription information.

In some embodiments, the information for RAT and/or frequency selection comprises an index parameter.

In some embodiments, the index parameter comprises a RFSP index.

In some embodiments, the processing circuitry is further configured to receive the knowledge of network slices from the UE, a RAN node, or another node.

In some embodiments, the information for RAT and/or frequency selection comprises information used to control a frequency on which a UE camps.

In some embodiments, the information for RAT and/or frequency selection comprises information used to configure frequency priorities for idle mode reselection.

In some embodiments, the RAN node comprises an enhanced or evolved Node B (eNB) or a New Radio Base Station (gNB).

According to another aspect, a method is implemented in a RAN node, the method comprising: receiving information for RAT and/or frequency selection; using the received information to determine UE-specific cell reselection priorities to control idle mode camping and/or active mode mobility; and providing the UE-specific cell reselection priorities to the UE; wherein at least one of: the received information for RAT and/or frequency selection was determined based on knowledge of network slices; or the received information for RAT and/or frequency selection further comprises the knowledge of network slices and wherein using the received information to determine UE-specific cell reselection priorities further comprises using the knowledge of network slices to determine the UE-specific cell reselection priorities.

In some embodiments, the knowledge of network slices comprises knowledge of: availability of network slices at the network; active slices for the UE; slices to which the UE is registered or connected; and/or slices to which the UE is allowed access based on subscription information.

In some embodiments, the information for RAT and/or frequency selection comprises an index parameter.

In some embodiments, the index parameter comprises a RFSP index.

In some embodiments, the information for RAT and/or frequency selection comprises information used to control a frequency on which a UE camps.

In some embodiments, the information for RAT and/or frequency selection comprises information used to configure frequency priorities for idle mode reselection.

According to another aspect, a communication system including a host computer comprises: processing circuitry configured to provide user data; and a communication interface configured to forward the user data to a cellular network for transmission to a UE, the CN node having processing circuitry, the CN node's processing circuitry configured to determine information for RAT and/or frequency selection, and send the determined information to a RAN node, wherein at least one of: the processing circuitry of the CN node is further configured to determine the determined information based on knowledge of network slices; or the processing circuitry of the CN node is further configured to send the knowledge of network slices to the RAN node along with the determined information.

In some embodiments, the system further includes the RAN node.

In some embodiments, the system further includes the UE, wherein the UE is configured to communicate with the RAN node.

In some embodiments, the processing circuitry of the host computer is configured to execute a host application, thereby providing the user data; and the UE comprises processing circuitry configured to execute a client application associated with the host application.

In some embodiments, the CN node comprises one of an AMF, a SMF, a MME, or a HSS.

In some embodiments, the knowledge of network slices comprises knowledge of: availability of network slices at the network; active slices for the UE; slices to which the UE is registered or connected; and/or slices to which the UE is allowed access based on subscription information.

In some embodiments, the information for RAT and/or frequency selection comprises an index parameter.

In some embodiments, the index parameter comprises a RFSP index.

In some embodiments, the knowledge of network slices is provided to the CN node from a UE, a RAN node, or other node.

In some embodiments, the information for RAT and/or frequency selection comprises information used to control a frequency on which a UE camps.

In some embodiments, the information for RAT and/or frequency selection comprises information used to configure frequency priorities for idle mode reselection.

According to another aspect, a method is implemented in a communication system including a host computer, a CN node, a RAN node, and a UE, the method comprising: at the host computer, providing user data; and at the host computer, initiating a transmission carrying the user data to the UE via a cellular network comprising the CN node, wherein the CN node determines information for RAT and/or frequency selection based on knowledge of network slices, and sends the information to the RAN node; wherein at least one of: the CN node determines the information based on knowledge of network slices; or the CN node sends the knowledge of network slices to the RAN node along with the determined information.

In some embodiments, the CN node comprises one of an AMF, a SMF, a MME, or a HSS.

In some embodiments, the knowledge of network slices comprises knowledge of: availability of network slices at the network; active slices for the UE; slices to which the UE is registered or connected; and/or slices to which the UE is allowed access based on subscription information.

In some embodiments, the information for RAT and/or frequency selection comprises an index parameter.

In some embodiments, the index parameter comprises a RFSP index.

In some embodiments, the knowledge of network slices is provided to the CN from a UE, a RAN node, or other node.

In some embodiments, the information for RAT and/or frequency selection comprises information used to control a frequency on which a UE camps.

In some embodiments, the information for RAT and/or frequency selection comprises information used to configure frequency priorities for idle mode reselection.

According to another aspect, a communication system including a host computer comprises: processing circuitry configured to provide user data; and a communication interface configured to forward the user data to a cellular network for transmission to a UE wherein the cellular network comprises a RAN node having a radio interface and processing circuitry, the RAN node's processing circuitry configured to determine information for RAT and/or frequency selection, to use the received information to determine UE-specific cell reselection priorities to control idle mode camping and/or active mode mobility, and to provide the UE-specific cell reselection priorities to the UE; wherein at least one of: the received information for RAT and/or frequency selection was determined based on knowledge of network slices; or the received information for RAT and/or frequency selection further comprises the knowledge of network slices and wherein the processing circuitry of the RAN is further configured to use the knowledge of network slices while determining the UE-specific cell reselection priorities.

In some embodiments, the RAN node comprises an eNB or a gNB.

In some embodiments, the RAN node is configured to receive the information from a CN node for supplying the information.

In some embodiments, the CN node comprises one of an AMF, a SMF, a MME, or a HSS.

In some embodiments, the system further includes the CN node.

In some embodiments, the RAN node is configured to receive the information from a UE node for supplying the information.

In some embodiments, the system further includes the UE, wherein the UE is configured to communicate with the RAN node.

In some embodiments, the processing circuitry of the host computer is configured to execute a host application, thereby providing the user data; and the UE comprises processing circuitry configured to execute a client application associated with the host application.

In some embodiments, the information for RAT and/or frequency selection comprises information used to control a frequency on which a UE camps.

In some embodiments, the information for RAT and/or frequency selection comprises information used to configure frequency priorities for idle mode reselection.

According to another aspect, a method is implemented in a communication system including a host computer, a RAN node, and a UE the method comprising: at the host computer, providing user data; and at the host computer, initiating a transmission carrying the user data to the UE via a cellular network comprising the RAN node receives information for RAT and/or frequency selection, uses the received information to determine UE-specific cell reselection priorities to control idle mode camping and/or active mode mobility, and provides the UE-specific cell reselection priorities to the UE; wherein at least one of: the received information for RAT and/or frequency selection was determined based on knowledge of network slices; or the received information for RAT and/or frequency selection further comprises the knowledge of network slices and wherein the RAN uses the knowledge of network slices while determining the UE-specific cell reselection priorities.

In some embodiments, the user data is provided at the host computer by executing a host application, the method further comprising: at the UE, executing a client application associated with the host application.

In some embodiments, the information for RAT and/or frequency selection comprises information used to control a frequency on which a UE camps.

In some embodiments, the information for RAT and/or frequency selection comprises information used to configure frequency priorities for idle mode reselection.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 8-11 are flowcharts illustrating methods implemented in a communication system including a host computer, a base station or other RAN node, and a UE in accordance with some embodiments;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Different cells or frequency layers may have different support for network slicing. One issue is how a User Equipment (UE) that is registered to a slice select a frequency or cell that supports that slice. Not all slices are expected to be available in the whole network, but slice availability should be consisted across the UE registration area. For this reason, information about slice availability should be provided to the UE, e.g., using dedicated signaling, such as the Radio Access Technology (RAT)/Frequency Selection Priority (RFSP) Index.

One problem is that the Radio Access Network (RAN) does not necessarily have knowledge about which slices the UE is currently registered to, which slices the UE is currently connected to, or which slices the UE is allowed to access, based on subscription information. This information is available, however, to some Core Network (CN) entities, such as an Authentication Management Function (AMF), a Mobility Management Entity (MME), or a Session Management Function (SMF).

To address the problem of how to assign dedicated priorities to the UE which can be used to control the cell, frequency, and RAT on which the UE camps or communicates on in scenarios where not all frequency bands or RATs support the same slices, embodiments of the present disclosure include methods and systems for RAT or frequency selection based on network slice availability.

In some embodiments, the selection considers information such as, but not limited to, availability of network slices at the network (e.g., within the UE registration area), the active network slices for the UE, the network slices that the UE is registered to or connected to, and the network slices that the UE is allowed to access, e.g., based on subscription information. In one embodiment, the selection comprises selecting an RFSP index value.

Figure 1:
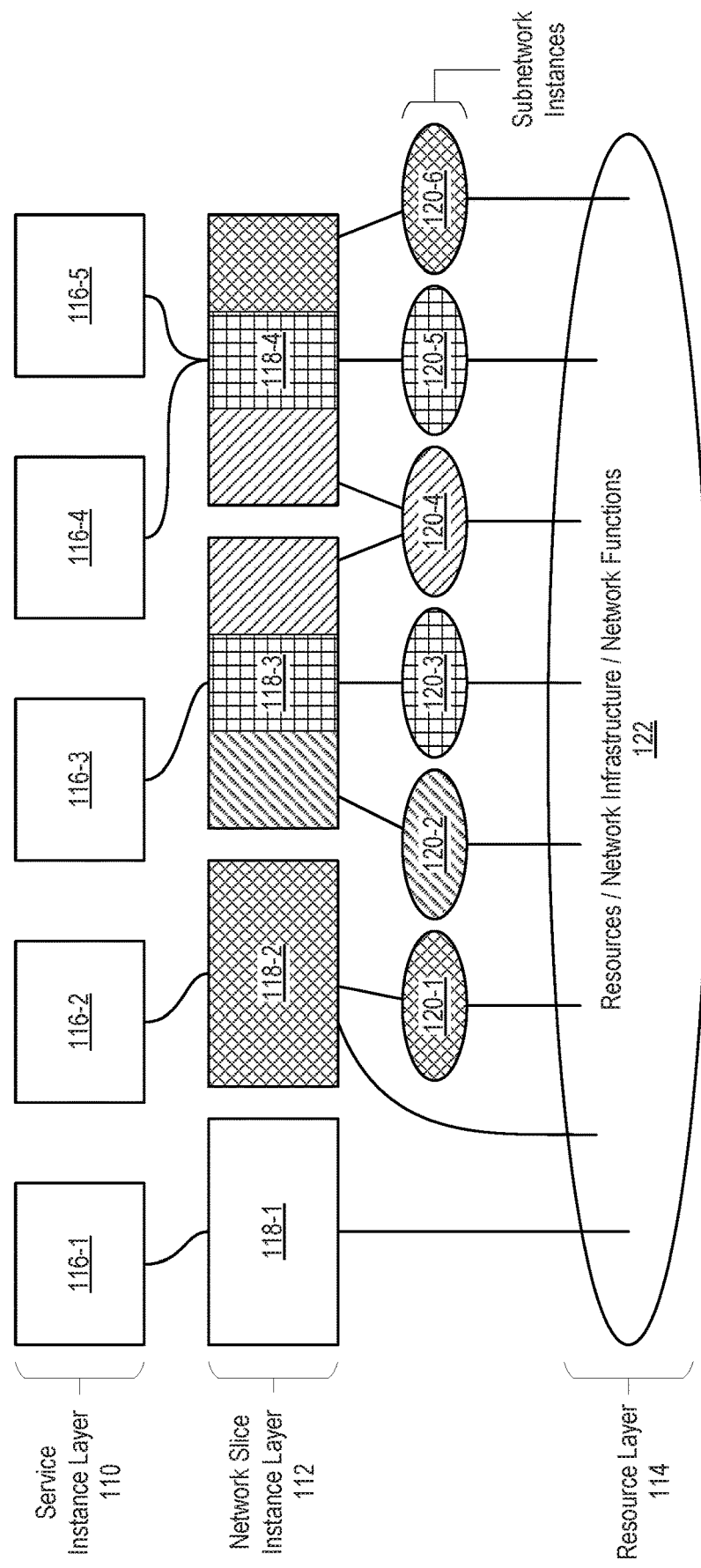
FIG. 1 illustrates the network slicing concept.
Figure 2:
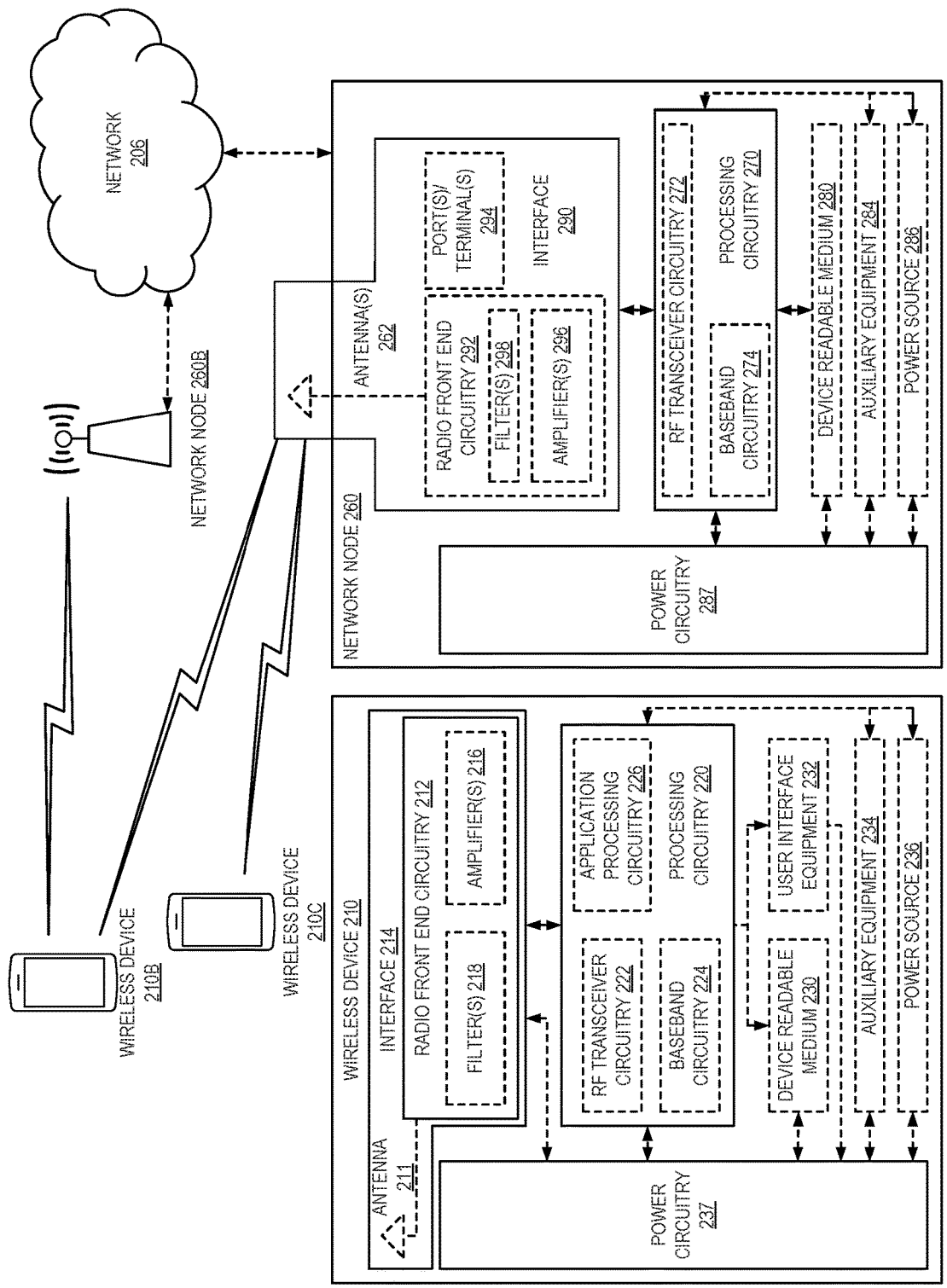
FIGS. 2 and 3 schematically illustrate wireless telecommunication networks in accordance with some embodiments.

FIG. 2 illustrates one embodiment of a wireless network in accordance with various aspects described herein. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260b, and Wireless Devices (WDs) 210, 210b, and 210c. In practice, a wireless network may further include any additional elements suitable to support communication between wireless devices or between a wireless device and another communication device, such as a landline telephone, a service provider, or any other network node or end device. Of the illustrated components, the network node 260 and WD 210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable Second Generation (2G), Third Generation (3G), Fourth Generation (4G), or Fifth Generation (5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, ZWave and/or Zig Bee standards.

Network 206 may comprise one or more backhaul networks, CNs, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices. The network node 260 and WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio access points), base stations (e.g., radio base stations, Node Bs, evolved or enhanced Node Bs (eNBs) and New Radio (NR) Base Stations (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such remote radio units may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR base stations, network controllers such as Radio Network Controllers (RNCs) or Base Station Controllers (BSCs), Base Transceiver Stations (BTSs), transmission points, transmission nodes, Multicell/Multicast Coordination Entities (MCEs), CN nodes (e.g., Mobile Switching Centers (MSCs), MMEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization and Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 284, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple Random Access Memory (RAM) modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple RATs. In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, Wideband Code Division Multiple Access (WCDMA), LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a System on a Chip (SOC).

In some embodiments, processing circuitry 270 may include one or more of Radio Frequency (RF) transceiver circuitry 272 and baseband processing circuitry 274. In some embodiments, RF transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, RAM, Read-Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer executable memory devices that store information, data, and/or instructions that may be used by processing circuitry 270. Device readable medium 280 may store any suitable instructions, data, or information, including a computer program, software, an application including one or more of logic, rules, code, tables, etc., and/or other instructions capable of being executed by processing circuitry 270 and utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signaling and/or data between network node 260, network 206, and/or WDs 210. As illustrated, interface 290 comprises one or more port(s) terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 292 and may be any type of antenna capable of transmitting and receiving data and/or signals wirelessly In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, WD refers to a device capable, configured, arranged, and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice Over IP (VoIP) phone, a wireless local loop phone, a desktop computer, a Personal Digital Assistant (PDA), a wireless cameras, a gaming console or device, a music storage device, a playback appliance, a wearable terminal device, a wireless endpoint, a mobile station, a tablet, a laptop, a Laptop-Embedded Equipment (LEE), a Laptop-Mounted Equipment (LME), a smart device, a wireless Customer-Premise Equipment (CPE), a vehicle-mounted wireless terminal device, etc. A WD may support Device-to-Device (D2D) communication, for example by implementing a Third Generation Partnership Project (3GPP) standard for sidelink communication, Vehicle-to-Vehicle (V2V), Vehicle-to-Infrastructure (V2I), Vehicle-to-Everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine Type Communication (MTC) device. As one particular example, the WD may be a UE implementing the 3GPP Narrowband IoT (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, WD 210 includes antenna 211, interface 214, processing circuitry 220, device readable medium 230, user interface equipment 232, auxiliary equipment 234, power source 236, and power circuitry 237. WD 210 may include multiple sets of one or more of the illustrated components for different wireless technologies supported by WD 210, such as, for example, GSM, WCDMA, LTE, NR, WiFi, WiMax, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprises one or more filters 218 and amplifiers 216. Radio front end circuitry 212 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a Universal Serial Bus (USB) port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

Figure 3:
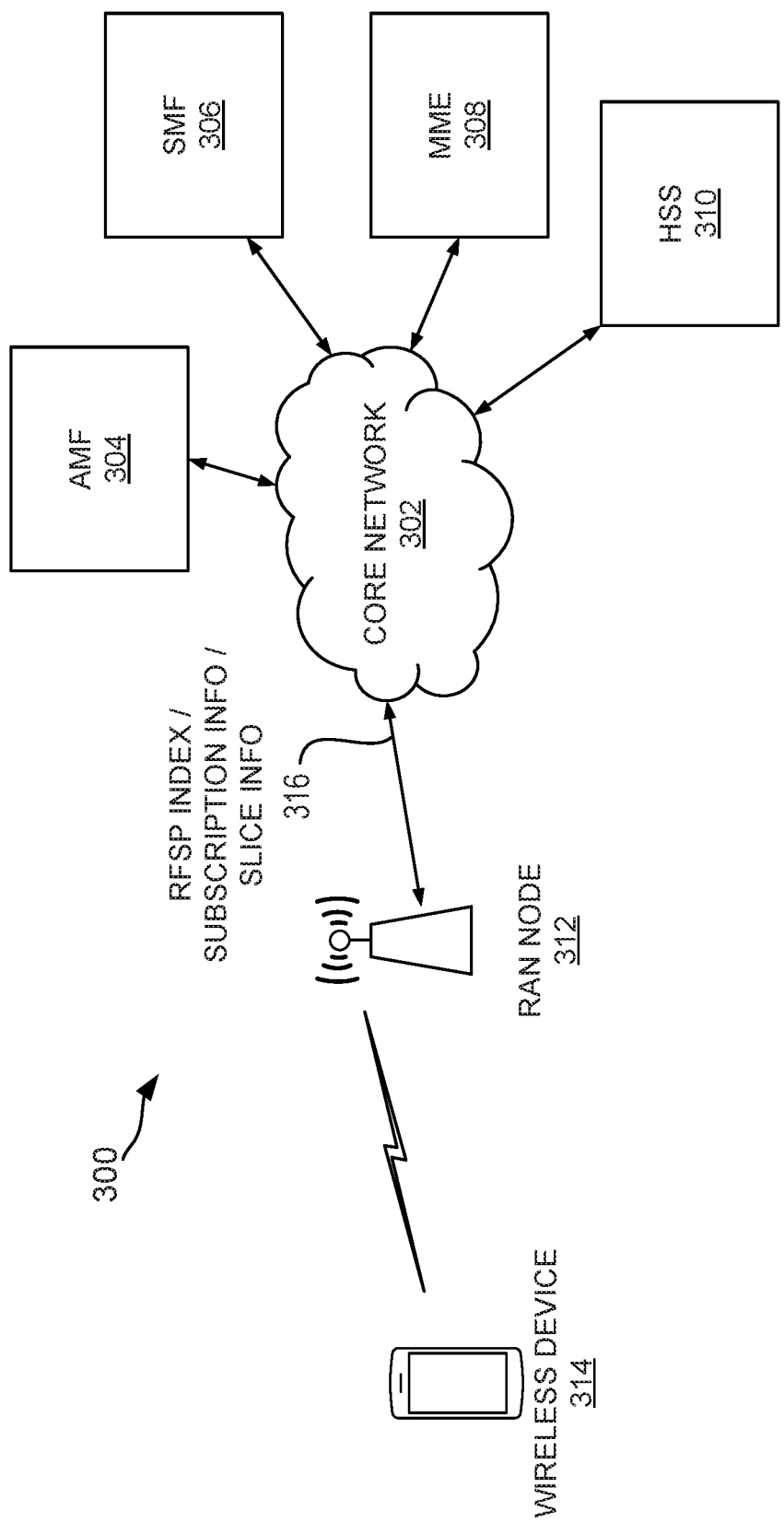

FIG. 3 illustrates one embodiment of a wireless network in accordance with various aspects described herein. In FIG. 3, a simplified telecommunications network 300 includes a CN 302 that includes various CN nodes. In the embodiment illustrated in FIG. 3, network 300 includes an AMF 304, an SMF 306, an MME 308, and a Home Subscriber Service (HSS) 310, but it should be understood that other types of nodes, and other sets of nodes, are also contemplated by the subject matter described herein. The CN 302 provides a connection between these CN nodes and a RAN node 312 that is servicing a wireless device 314, which may also be referred to herein as WD 314 or UE 314.

According to one aspect, a CN function is provided for setting (or selecting, calculating, determining, etc.) an index parameter for RAT and frequency selection based on slice knowledge associated with the UE. The index parameter may be provided to the RAN node 312 to be used for RAT or frequency selection for inactive or idle or active UEs. In the embodiment illustrated in FIG. 3, the RAN node 312 receives information 316 from a node in the CN 302. The information 316 may comprise an index parameter, subscription information, and/or slice information. In one embodiment, the index parameter may comprise a RFSP index. In some embodiments, the selected RFSP index value is communicated to a RAN, which can then set UE-specific cell reselection priorities to control idle mode camping, e.g., to ensure that the UE camps on a frequency layer or RAT that supports the slices that the UE is connected to. This solution can also be used to control the active mode (e.g., handover) mobility to steer UEs to the preferred frequency layer or RAT that supports the UE slice(s).

The RAN node 312, which may be, for example, an eNB/gNB, can then set the "UE-specific cell reselection priorities" to control idle mode camping, e.g., to ensure that the UE 314 camps on a frequency layer or RAT which supports the slices that the UE 314 is connected to. The solution can also be used to control the active mode (e.g., handover) mobility to steer UEs to the preferred frequency layer or RAT which support the UE slice.

According to another aspect, the RAN node 312 performs mapping to a mobility policies for UE active or idle mobility based on an index parameter and also slice information and/or subscription information provided by a CN node. In these embodiments, the RAN 312 performs the mapping to "UE-specific cell reselection priorities" based on index parameter as well as slice and/or subscription info provided by the CN. In some embodiments, this information can be combined with knowledge of, or based on, subscription related information or other information (e.g. Gold/Silver/Bronze subscription, Public Safety subscriptions, etc.) to set the value of the index parameter.

In one embodiment, the CN node that sets the index parameter comprises the AMF 304, SMF 308, or MME 308 node. In one embodiment, the index parameter is set/selected/calculated/determined/etc., based on knowledge of one or more of Availability of network slices at the network (e.g., within the UE registration area);
Active slices for the UE;
Slices to which the UE is registered or connected; and
Slices to which the UE is allowed access, e.g., based on subscription information.

The selection process may be performed by, or with the help of, a number of network entities, in which case some or all of information 316 may be sent by the AMF 304, the SMF 306, the MME 308, the HSS 310, or other CN nodes. For example, in embodiments where only slices that the UE 314 is allowed to access, based on subscription information are considered for assigning the RFSP, it is possible to select the RAT and/or frequency based on slice information in the HSS 310 or other subscription data base directly.

In embodiments where other, more dynamic information is considered, such as the active slices or the registered slices, it is possible to select the RAT and/or frequency based on information available to the AMF 304 and/or SMF 306. In these embodiments, the AMF 304 or SMF 306 may choose the RFSP Index, for example, based on the subscribed RFSP Index, the locally configured operator's policies and the UE related context information available at the AMF, including UE's usage setting In alternative embodiments, different network entities may perform different parts of the selection process. For example, in one embodiment, some information may be provided by the HSS 310 (e.g. a set of valid RFSPs) and other information may be provided by the AMF 304 (e.g. AMF 304 selects one of the valid RFSP based on slice information).

In an alternative embodiment of the solution, the CN provide the RAN node 312 with both information about the RFSP as well as information about which slices e.g., availability of network slices at the network (e.g., within the UE registration area); active slices for the UE; slices to which the UE is registered or connected; and slices which the UE based on subscription information is allowed to access. In this embodiment, the RAN node 312 may perform the final mapping between RFSP and slice information to determinate the "UE-specific cell reselection priorities" to control idle mode camping or control the active mode (e.g., handover) mobility to steer UEs to the preferred frequency layer or RAT which support the UE slice.

As mentioned above, according to SA2/RAN3 understanding all slices are not expected to be available in the whole network, however the slice availability will be consistent across the UE registration area. This means if a slice is available in one NR or LTE cell, it is at least available in all cells belonging to the same CN tracking area. This means that any changes to slice availability can be handled when the UE perform a CN level registration area change. This is also the current understanding in 3GPP TS 23.501 section 5.15 where availability and connectivity to slices is handled on a Non-Access Stratum (NAS) level.

The consequence of this agreement related to slice availability on different frequency layer is that if the different frequency layers do not support the same slice they cannot be part of the same CN tracking area. This is however acceptable since the network can, in case it supports multiple frequency layers with different slice support, configure the UEs with different registration areas (Tracking Area (TA) lists) depending on if the UE is connected to a slice which is supported in multiple frequency layers or which is supported in single frequency layer. In the latter case the UE needs to perform a CN registration area update when change frequency layer, in the former case no update is required.

Changing the current SA2/RAN3 assumption can allow different slice availability within the CN tracking/registration area would lead to significant problems, such as: UEs may not be reachable for service but does not know about it; and UEs may respond to page in areas where they cannot be served.

In one embodiment, the SA2/RAN3 agreement on consistent slice and service support within a UE registration area is maintained kept. In such embodiments, different frequency layers supporting different slices need to be assigned different CN tracking areas.

The network is expected to support a large number of slices. This makes it inefficient to provide input on slice availability on the system information for frequency selection; instead the solution should rely on dedicated means. Currently in LTE there is support for dedicated frequency prioritization based on subscription information using the idleModeMobilityControlInfo (specified in 3GPP TS 36.331). The RAN knows the UE subscription information from the subscriber profile Identifier (ID) for RFSP (see 3GPP TS 36.413). The mapping between these parameters is up to local RAN configuration (see 3GPP TS 36.300).

For 5GC, SA2 has introduced the concept of RFSP information which seems to have similar purpose as the Subscriber Profile ID for RAT/Frequency priority in LTE/Enhanced Packed Core (EPC). Given that the 5GC has knowledge about which slices the UE is connected to as well as information about which slices the UE can connect to it should be possible to set the RFSP based on this knowledge thus enabling the RAN node 312 to set the idleModeMobilityControlInfo. Alternatively, it would be possible for the gNB to set the idleModeMobilityControlInfo by itself based on a combination of the RFSP and knowledge of which slices the UE 314 was connected to at the time of the release. The RAN node 312 will know this since the slice information is included in the 3GPP TS 38.413 PDU SESSION RESOURCE SETUP REQUEST.

In one embodiment, the CN could set the RFSP considering slice information, since that would minimize RAN impacts and lead to consistent handling for all service/slice information. The CN also anyway needs to have knowledge of UE slice information when assigning the UE registration area.

In case the UE is assigned to multiple slices, the frequency prioritization needs to consider this. In our view, this should be feasible since both the CN has the knowledge of the supported slices and can set the RFSP according to which slice is the most prioritized or alternatively have a specific RFSP value for a combination of slices. We think it would be a rare case where slices supported by a single UE would not have a common frequency layer support all the slices. In one embodiment, the RAN should map the RFSP to a configured idleModeMobilityControlInfo which is independent if the RFSP was set due to slicing or other subscription related information.

In one embodiment, slice availability should not be broadcasted and used for UE based RAT, frequency or cell selection. Instead it is sufficient to use network controlled mechanism as agreed in RAN2 #99 for supporting limited slice availability.

Figure 4:
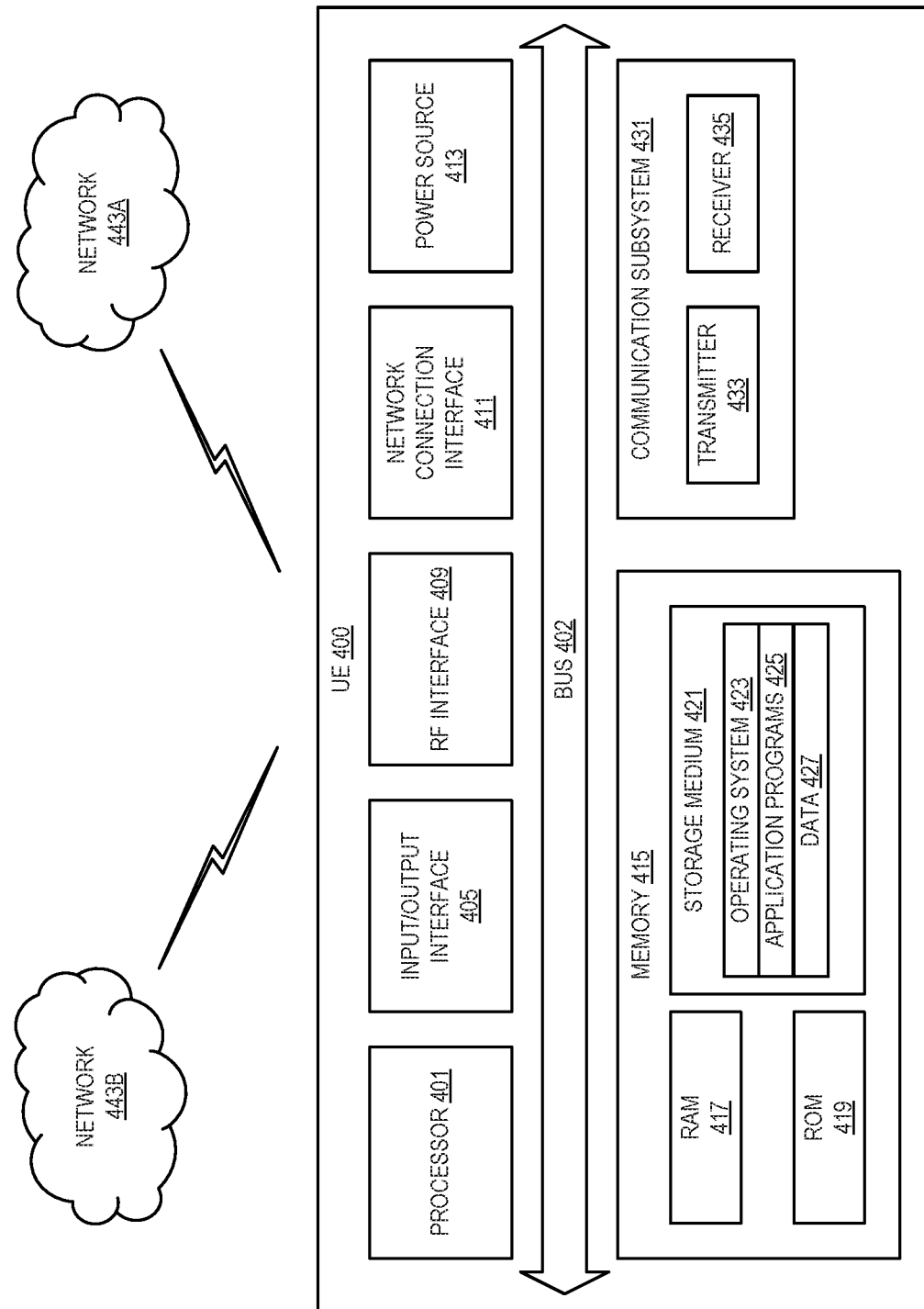
FIG. 4 illustrates a User Equipment (UE) in accordance with some embodiments.

FIG. 4 illustrates one embodiment of a UE in accordance with various aspects described herein. As used herein, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the 3GPP, including a NB-IoT UE, a MTC UE, and/or an enhanced MTC (eMTC) UE. UE 400, as illustrated in FIG. 4, is one example of a WD configured for communication in accordance with one or more communication standards promulgated by the 3GPP, such as 3GPP's GSM, UMTS, LTE, and/or 5G standards. As mentioned previously, the term WD and UE may be used interchangeably. Accordingly, although FIG. 4 is a UE, the components discussed herein are equally applicable to a WD, and vice-versa.

In FIG. 4, UE 400 includes processing circuitry 401 that is operatively coupled to input/output interface 405, RF interface 409, network connection interface 411, memory 415 including RAM 417, ROM 419, and storage medium 421, or the like, communication subsystem 431, power source 413, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a LAN, a WAN, a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic Input and Output (I/O), startup, or reception of keystrokes from a keyboard that are stored in a non-volatile memory. Storage medium 421 may be configured to include memory such as RAM, ROM, Programmable Read-Only Memory (PROM), Erasable PROM (EPROM), Electrically EPROM (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as Redundant Array of Independent Disks (RAID), floppy disk drive, flash memory, USB flash drive, external hard disk drive, thumb drive, pen drive, key drive, High-Density DVD (HD-DVD) optical disc drive, internal hard disk drive, Blu-Ray optical disc drive, Holographic Digital Data Storage (HDDS) optical disc drive, external mini-Dual In-line Memory Module (DIMM), Synchronous Dynamic RAM (SDRAM), external micro-DIMM SDRAM, smartcard memory such as a Subscriber Identity Module (SIM) or a Removable User Identity Module (RUIM), other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a RAN according to one or more communication protocols, such as IEEE 802.4, Code Division Multiple Access (CDMA), WCDMA, GSM, LTE, Universal Terrestrial Access Network (UTRAN), WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software, or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the Global Positioning System (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a LAN, a WAN, a computer network, a wireless network, a telecommunications network, another like network or any combination thereof. For example, network 443b may be a cellular network, a Wi-Fi network, and/or a near-field network. Power source 413 may be configured to provide Alternating Current (AC) or Direct Current (DC) power to components of UE 400.

The features, benefits, and/or functions described herein may be implemented in one of the components of UE 400 or partitioned across multiple components of UE 400. Further, the features, benefits, and/or functions described herein may be implemented in any combination of hardware, software, or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Cloud Implementation

In one embodiment, the mapping from slice information to RFSP can be performed in a node subject to virtualization.

Figure 5:
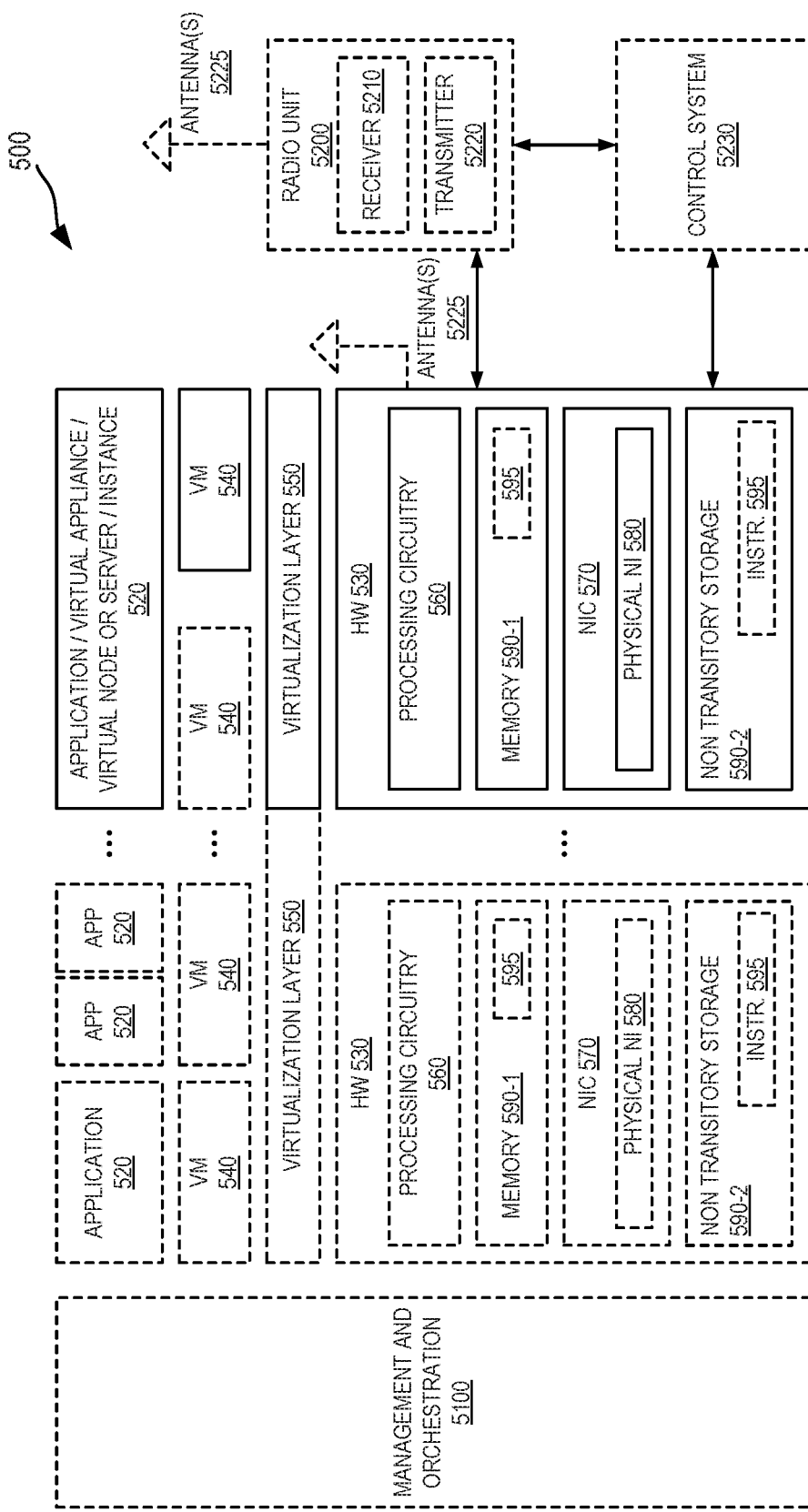
FIG. 5 illustrates a virtualization environment in accordance with some embodiments.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access network node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access network node or does not require radio connectivity (e.g., a CN node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more Network Interface Controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways. During operation, processing circuitry 560 executes software 595 to instantiate the hypervisor or virtualization layer 550, which may sometimes be referred to as a Virtual Machine Monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or CPE) where many hardware nodes work together and are managed via Management and Orchestration (MANO) 5100, which, among others, oversees lifecycle management of applications 520.

Virtualization of the hardware is in some contexts referred to as Network Function Virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate Virtual Network Elements (VNEs).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access network node or a base station.

In some embodiments, some signaling can be effected with the use of control system 5230 which may alternatively be used for communication between the hardware nodes 530 and radio units 5200.

Over-the-Top (OTT) Over Network Slice

Figure 6:
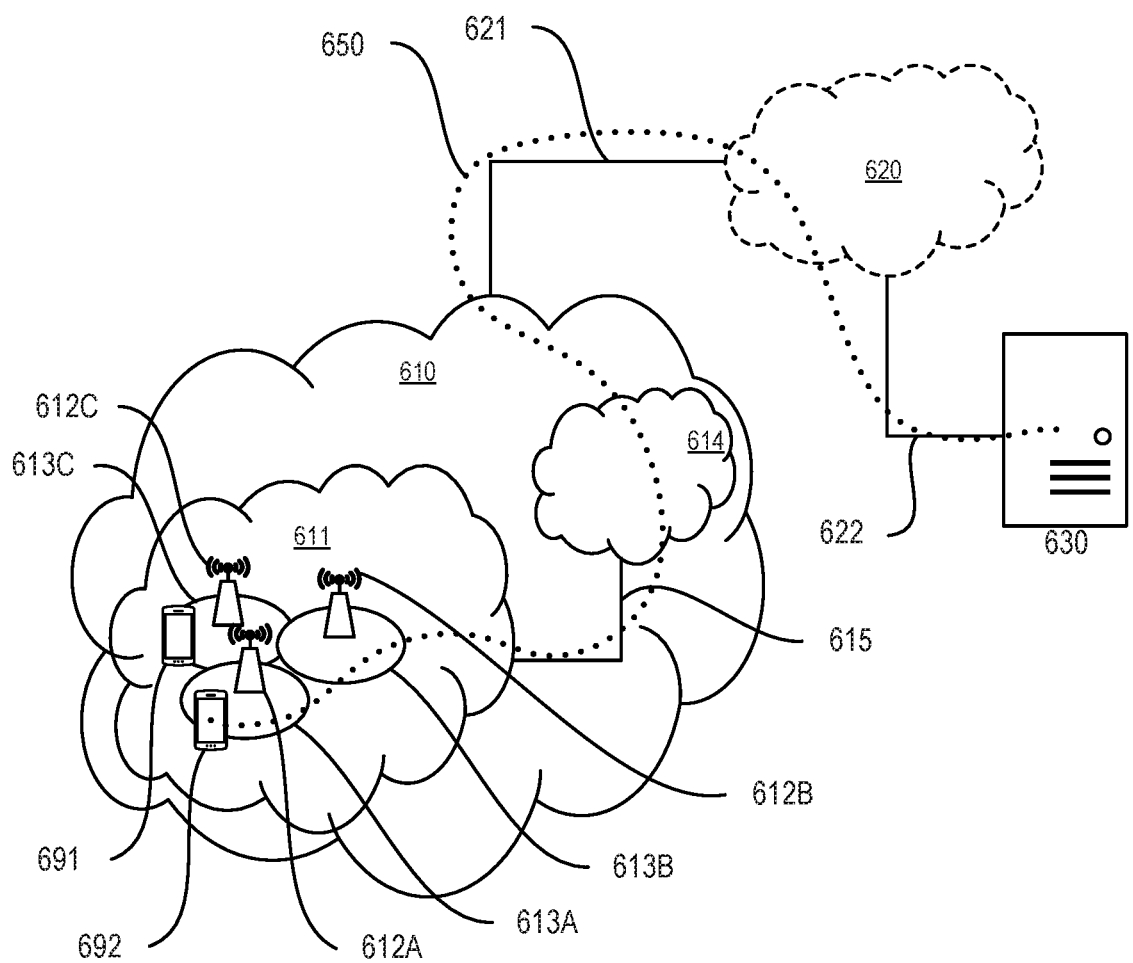
FIG. 6 illustrates a telecommunication network connected via an intermediate network to a host computer in accordance with some embodiments.

FIG. 6 illustrates one embodiment of a communication system according to various aspects described herein. With reference to FIG. 6, in accordance with an embodiment, a communication system includes telecommunication network 610, such as a 3GPP-type cellular network, which comprises access network 611, such as a radio access network, and CN 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to CN 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from CN 614 to host computer 630 or may go via an optional intermediate network 620. Intermediate network 620 may be one of, or a combination of more than one of, a public, private, or hosted network; intermediate network 620, if any, may be a backbone network or the Internet; in particular, intermediate network 620 may comprise two or more sub-networks (not shown).

The communication system of FIG. 6 as a whole enables connectivity between the connected UEs 691, 692 and host computer 630. The connectivity may be described as an OTT connection 650. Host computer 630 and the connected UEs 691, 692 are configured to communicate data and/or signaling via OTT connection 650, using access network 611, CN 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Figure 7:
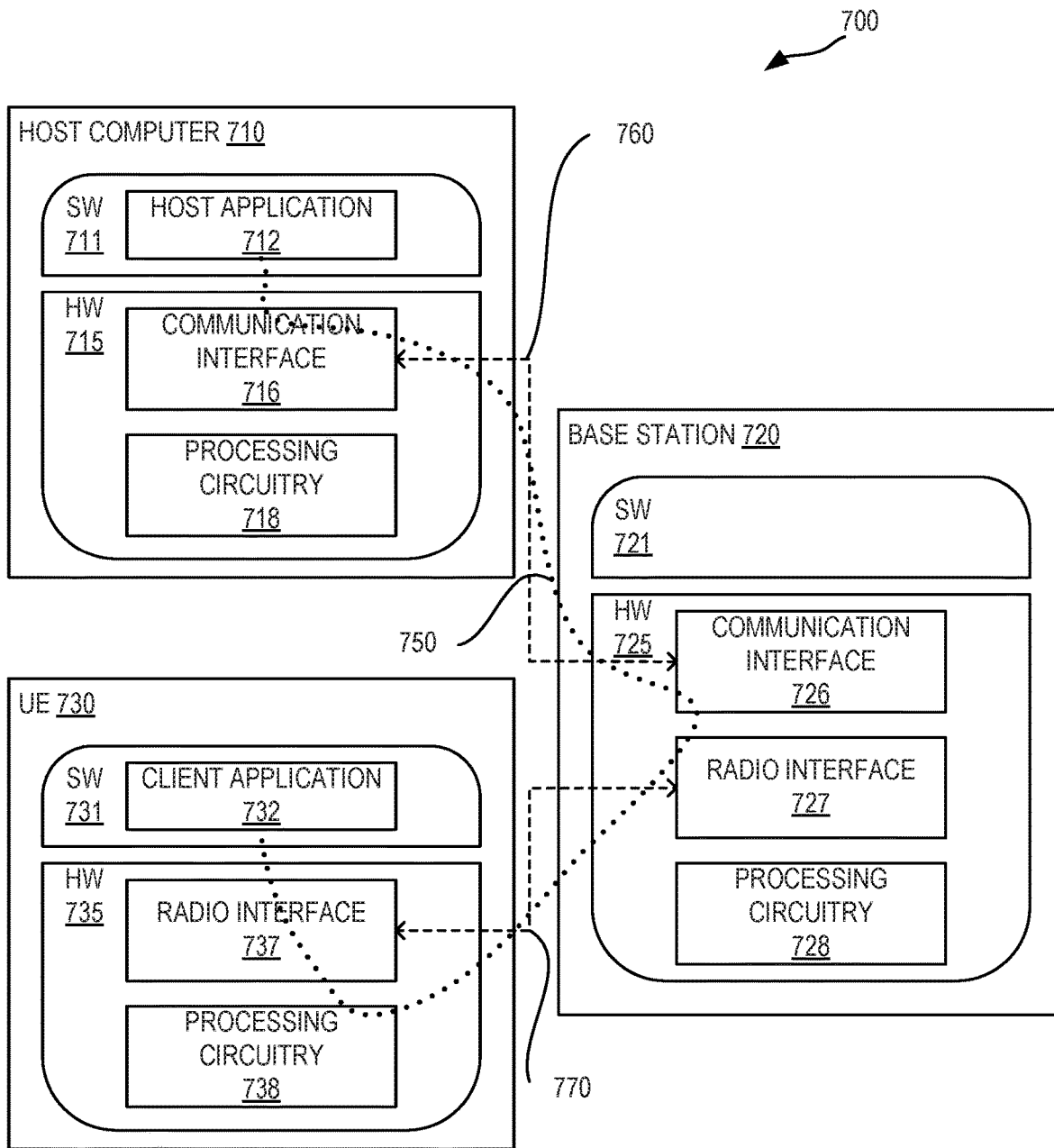
FIG. 7 is a generalized block diagram of a host computer communicating via a base station or other Radio Access Network (RAN) node with a UE over a partially wireless connection in accordance with some embodiments.

FIG. 7 illustrates another embodiment of a communication system according to various aspects described herein. Example implementations, in accordance with an embodiment, of the UE, base station, and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a CN (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve network slice selection and thereby provide benefits such as uninterrupted OTT service.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency, and the like. The measurements may be implemented in that software 711 and 731 causes messages to be transmitted, in particular empty or 'dummy' messages, using OTT connection 750 while it monitors propagation times, errors etc.

FIG. 8 is a flowchart illustrating a method implemented in a communication system including a host computer, a base station, and a UE in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

FIG. 9 is a flowchart illustrating a method implemented in a communication system including a host computer, a base station, and a UE in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figures 10, 11:
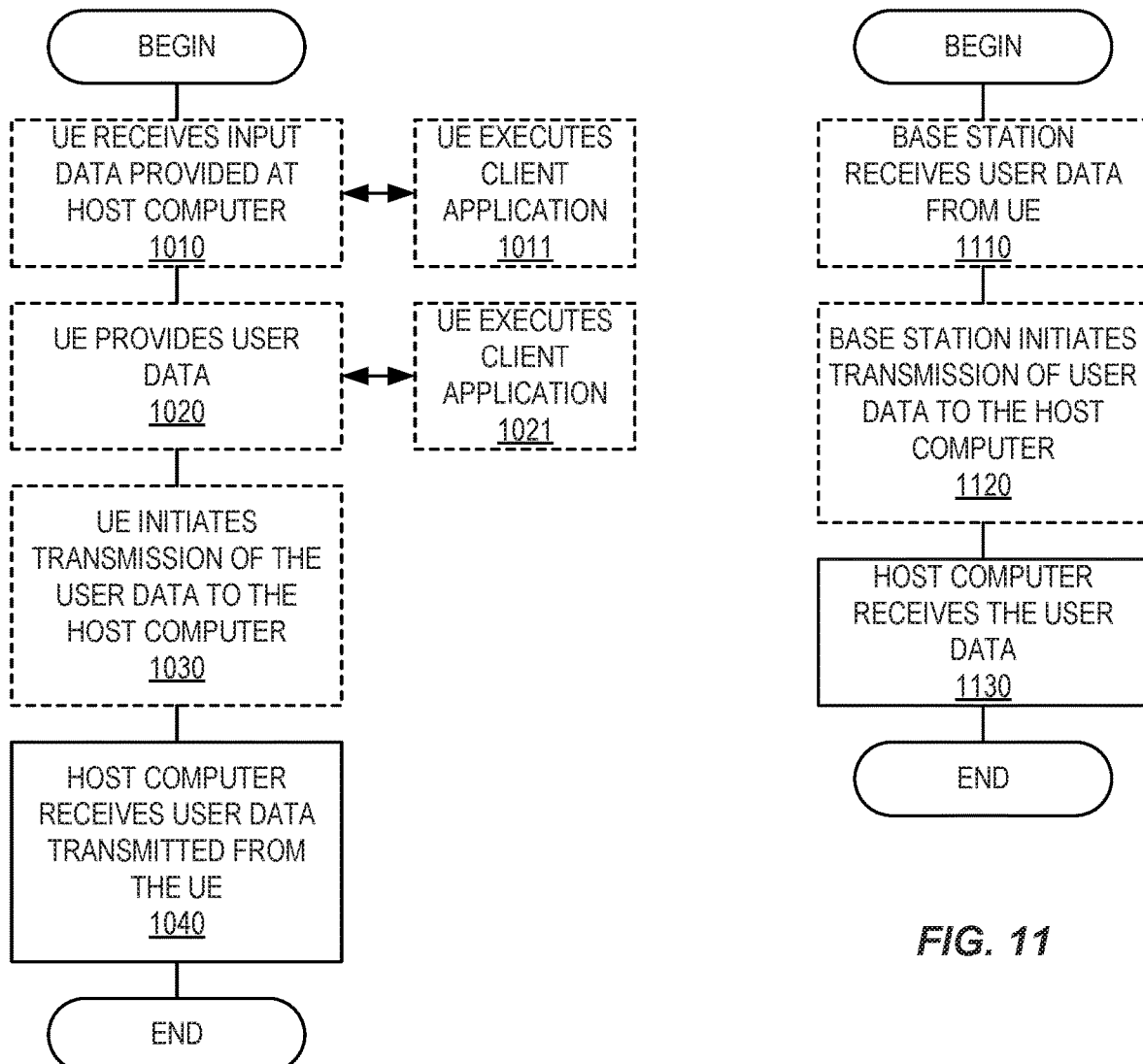

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Figure 12:
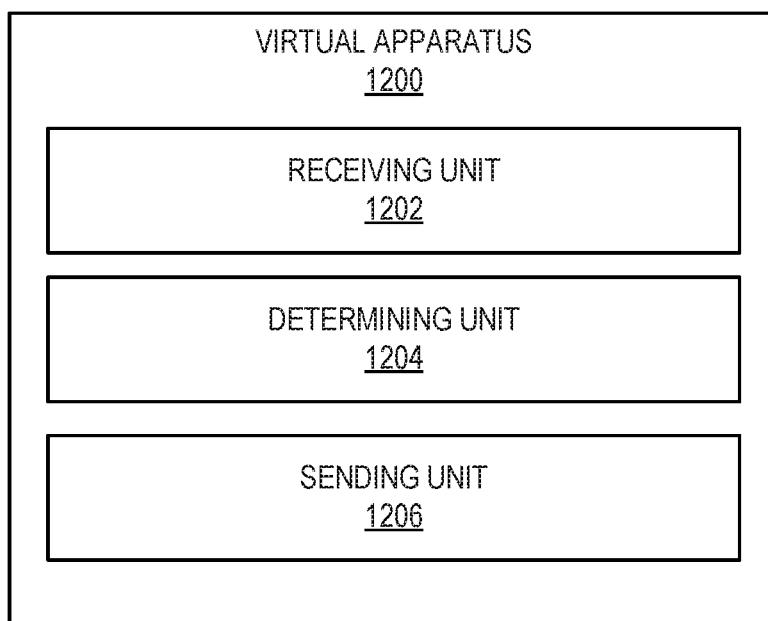
FIG. 12 illustrates a virtualization apparatus in accordance with some embodiments.

FIG. 12 illustrates a schematic block diagram of an apparatus 1200 in a wireless network (for example, the wireless network shown in FIG. 2). The apparatus may be implemented in a wireless device, base station, or network node (e.g., wireless device 210 or network node 260 shown in FIG. 2 or base station 720 shown in FIG. 7). Apparatus 1200 is operable to carry out the example processes or methods disclosed herein. It is also to be understood that the processes or methods disclosed herein are not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause various units within apparatus to perform corresponding functions according one or more embodiments of the present disclosure.

As illustrated in FIG. 12, apparatus 1200 includes one or more of the following: a receiving unit 1202, a determining unit 1204, and a sending unit 1206. In one embodiment, apparatus 1200 may implement functions of a base station, in which case a receiving 1202 unit may receive information for Radio Access Technology (RAT) and/or frequency selection based on knowledge of network slices, and a sending unit 1206 may provide the information to a UE. In another embodiment, apparatus 1200 may implement functions of a CN node, in which case a determining unit 1204 may determine information for Radio Access Technology (RAT) and/or frequency selection based on knowledge of network slices, and a sending unit 1206 may send the information to a base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 13:
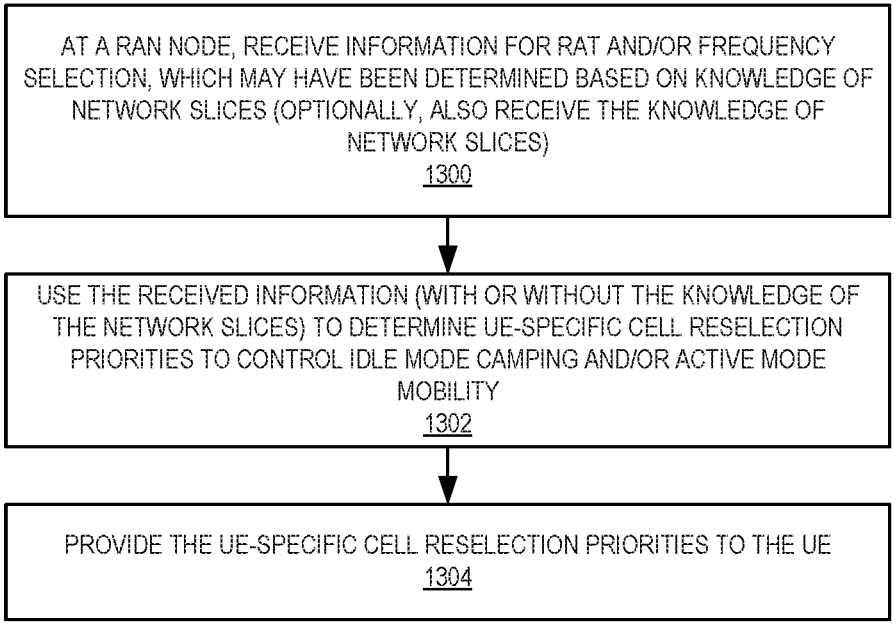
FIG. 13 is a flowchart illustrating a method implemented in a RAN node in accordance with some embodiments.

FIG. 13 is a flowchart illustrating a method implemented in a base station in accordance with some embodiments. In the embodiment illustrated in FIG. 13, the method includes receiving information for RAT and/or frequency selection, which may or may not have been determined based on knowledge of network slices, and which may optionally also include the knowledge of network slices (step 1300); using the received information (with or without the knowledge of the network slices) to determine UE-specific cell reselection priorities to control idle mode camping and/or active mode mobility (step 1302); and providing the UE-specific cell reselection priorities to the UE (step 1304).

Figure 14:
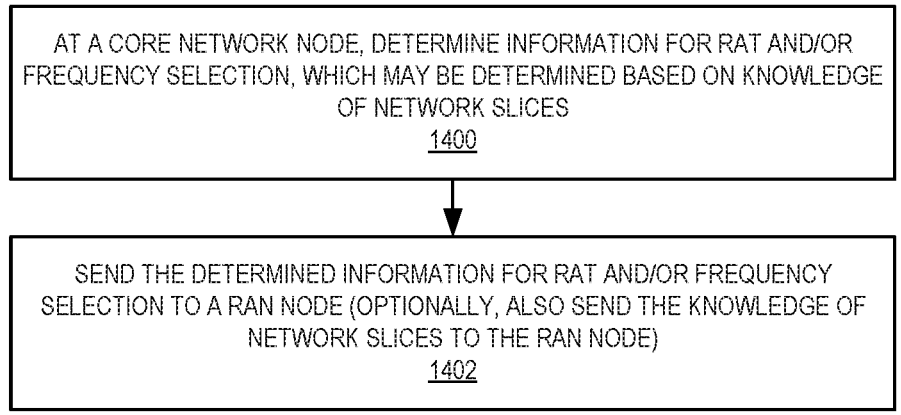
FIG. 14 is a flowchart illustrating a method implemented in a Core Network (CN) node in accordance with some embodiments.

FIG. 14 is a flowchart illustrating a method implemented in a CN node in accordance with some embodiments. In the embodiment illustrated in FIG. 14, the method includes determining information for RAT and/or frequency selection, which may or may not be determined based on knowledge of network slices (step 1400); and sending the information (which optionally may also contain the knowledge of network slices) to a RAN node (step 1402).

For example, in one embodiment, the CN node may consider the knowledge of network slices when determining the information for RAT and/or frequency selection and send just the determined information to the RAN node. In another embodiment, the CN node may determine the information for RAT and/or frequency selection without considering the knowledge of network slices and instead opt to send the knowledge of network slices to the RAN node along with the information determined by the CN node, and let the RAN node make its own decisions based on the information determined by the CN node and the knowledge of network slices. In yet another embodiment, the CN node may consider the knowledge of network slices while determining the information for RAT and/or frequency selection but send the knowledge of network slices information to the RAN node along with the information determined by the CN node anyway, in which case both the CN node and the RAN node consider the knowledge of network slices while making their respective determinations.

Advantages of the Proposed Solution

The advantage of the solution in the case where the CN performs the mapping between UE slices and an index parameter, such as the RFSP index, by itself is that the RAN or RAN node does not need to be aware on why a specific UE is assigned to a particular index parameter. The RAN or RAN node only needs to know which UE-specific cell frequency RAT reselection priorities shall be applied for a given RFSP index.

The solution can be used both for IDLE (UE triggered) and ACTIVE (network controlled) mobility.

The CN can also consider (other) subscription based information in the setting of the RFSP index which makes it possible to have cell/frequency selection policies consistent with both slice information and other subscription related policies. This would be difficult in a RAN based solution since the RAN does not know so much about subscription information.

The advantage with the alternative embodiment when the CN provides the slice information to the RAN together with the RFSP index is that in this case information related to not only active slices for the UE, but also registered and supported slices becomes available in the RAN, enabling some of the drawbacks above such as lack of knowledge of subscription information be solved.

NUMBERED EMBODIMENTS

While not being limited thereto, some example embodiments of the present disclosure are provided below.

1. A base station configured to communicate with a UE, the base station comprising a radio interface and processing circuitry configured to: receive information for RAT and/or frequency selection based on knowledge of network slices; and provide the information to the UE.

2. The base station of embodiment 1, wherein the knowledge of network slices comprises knowledge of: active slices for the UE; slices to which the UE is registered or connected; and/or slices to which the UE is allowed access based on subscription information.

3. The base station of embodiment 1 or 2, wherein the information for RAT and/or frequency selection comprises an index parameter.

4. The base station of embodiment 3 wherein the index parameter comprises a RAT and/or RFSP index.

5. The base station of any one of embodiments 1 to 4, wherein the base station is configured to receive the knowledge of network slices from the UE, a RAN node, or another node.

6. A communication system including a host computer comprising: processing circuitry configured to provide user data; and a communication interface configured to forward the user data to a cellular network for transmission to a UE, wherein the cellular network comprises a base station having a radio interface and processing circuitry, the base station's processing circuitry configured to: receive information for RAT and/or frequency selection based on knowledge of network slices; and provide the information to the UE.

7. The communication system of embodiment 6, wherein the base station is configured to receive the information from a CN node for supplying the information.

8. The communication system of embodiments 6 or 7, further including the CN node.

9. The communications system of any one of embodiments 6 to 8, wherein the base station is configured to receive the information from a UE node for supplying the information.

10. The communication system of any one of embodiments 6 to 8, further including the UE, wherein the UE is configured to communicate with the base station.

11. The communication system of any one of embodiments 6 to 10, wherein: the processing circuitry of the host computer is configured to execute a host application, thereby providing the user data; and the UE comprises processing circuitry configured to execute a client application associated with the host application.

12. A CN node configured to communicate with a base station, the CN node comprising processing circuitry configured to: determine information for RAT and/or frequency selection based on knowledge of network slices; and send the information to the base station.

13. The CN node of embodiment 12 wherein the CN node comprises one of an AMF, a SMF, a MME, or a HSS.

14. The CN node of embodiment 12 or 13 wherein the knowledge of network slices comprises knowledge of: active slices for the UE; slices to which the UE is registered or connected; and/or slices to which the UE is allowed access based on subscription information.

15. The CN node of any one of embodiments 12 to 14 wherein the information for RAT and/or frequency selection comprises an index parameter.

16. The CN node of embodiment 15 wherein the index parameter comprises a RFSP index.

17. The CN node of any of embodiments 12 to 16 wherein the knowledge of network slices is provided to the CN from a UE, a RAN node, or other node.

18. A communication system including a host computer comprising: processing circuitry configured to provide user data; and a communication interface configured to forward the user data to a cellular network for transmission to a UE, wherein the cellular network comprises a CN node having processing circuitry, the CN node's processing circuitry configured to: determine information for RAT and/or frequency selection based on knowledge of network slices; and send the information to the base station.

19. The communication system of embodiment 18, further including the base station.

20. The communication system of embodiment 18 or 19, further including the UE, wherein the UE is configured to communicate with the base station.

21. The communication system of any of embodiments 18 to 20, wherein: the processing circuitry of the host computer is configured to execute a host application, thereby providing the user data; and the UE comprises processing circuitry configured to execute a client application associated with the host application.

22. The communication system of any one of embodiments 18 to 21 wherein the CN node comprises one of an AMF, a SMF, a MME, or a HSS.

23. The communication system of any one of embodiments 18 to 22 wherein the knowledge of network slices comprises knowledge of: active slices for the UE; slices to which the UE is registered or connected; and/or slices to which the UE is allowed access based on subscription information.

24. The communication system of any one of embodiments 18 to 23 wherein the information for RAT and/or frequency selection comprises an index parameter.

25. The communication system of embodiment 24 wherein the index parameter comprises a RFSP index.

26. The communication system of any of embodiments 18 to 25 wherein the knowledge of network slices is provided to the CN node from a UE, a RAN node, or other node.

27. A method implemented in a base station, the method comprising receiving information for RAT and/or frequency selection based on knowledge of network slices; and providing the information to the UE 28. The method of embodiment 27, wherein the information for RAT and/or frequency selection comprises an index parameter.

29. The method of embodiment 28, wherein the index parameter comprises a RFSP index.

30. A method implemented in a communication system including a host computer, a base station and a UE, the method comprising: at the host computer, providing user data; and at the host computer, initiating a transmission carrying the user data to the UE via a cellular network comprising the base station, wherein the base station receives information for RAT and/or frequency selection based on knowledge of network slices; and provides the information to the UE.

31. The method of embodiment 30, wherein the user data is provided at the host computer by executing a host application, the method further comprising: at the UE, executing a client application associated with the host application.

32. A method implemented in a CN node, the method comprising: determining information for RAT and/or frequency selection based on knowledge of network slices; and sending the information to the base station.

33. The method of embodiment 32 wherein the knowledge of network slices comprises knowledge of: active slices for the UE; slices to which the UE is registered or connected; and/or slices to which the UE is allowed access based on subscription information.

34. The method of embodiment 32 or 33 wherein the information for RAT and/or frequency selection comprises an index parameter.

35. The method of embodiment 34 wherein the index parameter comprises a RAT and/or RFSP index.

36. A method implemented in a communication system including a host computer, a CN node, a base station, and a UE, the method comprising: at the host computer, providing user data; and at the host computer, initiating a transmission carrying the user data to the UE via a cellular network comprising the CN node, wherein the CN node: determines information for RAT and/or frequency selection based on knowledge of network slices; and sends the information to the base station.

37. The method of embodiment 39 wherein the knowledge of network slices comprises knowledge of: active slices for the UE; slices to which the UE is registered or connected; and/or slices to which the UE is allowed access based on subscription information.

38. The method of embodiment 36 or 37 wherein the information for RAT and/or frequency selection comprises an index parameter.

39. The method of embodiment 38 wherein the index parameter comprises a RAT and/or RFSP index.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
5GC Fifth Generation Core Network
AC Alternating Current
AMF Authentication Management Function
AN Access Network
AP Access Point
ASIC Application Specific Integrated Circuit
ATM Asynchronous Transfer Mode
BSC Base Station Controller
BTS Base Transceiver Stations
CCNF Common Control Network Functions
CD Compact Disk
CDMA Code Division Multiple Access
CN Core Network
COTS Commercial On-the-Shelf
CPE Customer-Premise Equipment
CPU Central Processing Unit
D2D Device-to-Device
DAS Distributed Antenna System
DC Direct Current
DIMM Dual In-line Memory Module
DRB Data Radio Bearer
DSP Digital Signal Processor
DVD Digital Video Disk
EEPROM Electrically Erasable Programmable Read-Only Memory
eMTC Enhanced Machine Type Communication
eNB Enhanced or Evolved Node B
EPC Enhanced Packet Core
EPROM Erasable Programmable Read-Only Memory
E-SMLC Evolved Serving Mobile Location Centers
E-UTRA Evolved Universal Terrestrial Radio Access
gNB New Radio Base Station
GPS Global Positioning System
GSM Global System for Mobile Communications
HDDS Holographic Digital Data Storage
HD-DVD High-Density Digital Video Disk
HPLMN Home Public Land Mobile Network
HSS Home Subscriber Server
ID Identifier
I/O Input/Output
IoT Internet of Things
IP Internet Protocol
LAN Local Area Network
LEE Laptop-Embedded Equipment
LME Laptop-Mounted Equipment
LTE Long Term Evolution
M2M Machine-to-Machine
MANO Management and Orchestration
MCE Multicell/Multicast Coordination Entity
MDT Minimization and Drive Tests
MIMO Multiple Input Multiple Output
MM Mobility Management
MME Mobility Management Entity
MSC Mobile Switching Center
MSR Multiple Standard Radio
MTC Machine Type Communication
NAS Non-Access Stratum
NB Node B
NB-IoT Narrowband Internet of Things
NFV Network Function Virtualization
NG Next Generation
NG-RAN Next Generation Radio Access Network
NIC Network Interface Controller
NR New Radio
NSI Network Slice Instance NSISF Network Slice Instance Selection Function
NSSAI Network Slice Selection Assistance Information
O&M Operation and Maintenance
OSS Operations Support System
OTT Over-The-Top
PDA Personal Digital Assistant
PDU Protocol Data Unit
PROM Programmable Read-Only Memory
PSTN Public Switched Telephone Network
RACH Random Access Channel
RAID Redundant Array of Independent Disks
RAM Random Access Memory
RAN Radio Access Network
RAN2 3GPP Technical Specification Group on Radio Layer 2 and Radio Layer 3: Radio Interface Architecture
RAT Radio Access Technology
Rel Release
RF Radio Frequency
RFSP RAT/Frequency Selection Priority
RNC Radio Network Controllers
ROM Read-Only Memory
RRC Radio Resource Control
RRH Remote Radio Head
RRM Radio Resource Management
RRU Remote Radio Unit
RUIM Removable User Identity Module
SA2 3GPP Technical Specification Group on Service and System Aspects:Architecture
SD Slice Differentiator
SDRAM Synchronous Dynamic Random Access Memory
SIM Subscriber Identity Module
SMF Session Management Function
SM-NSSAI Session Management Network Slice Selection Assistance Information
SOC System on a Chip
SON Self-Organizing Network
SONET Synchronous Optical Networking
SST Slice Service Type
TA Tracking Area
TCP Transmission Control Protocol
TS Technical Specification
UE User Equipment
UMTS Universal Mobile Telecommunications System
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice-Over Internet Protocol
WAN Wide-Area Network
WCDMA Wideband Code Division Multiple Access
WD Wireless Device
WG Working Group
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A Core Network, CN, node configured to communicate with a Radio Access Network, RAN, node, the CN node comprising processing circuitry configured to:
   determine, based on knowledge of network slices associated with a User Equipment, UE, information for Radio Access Technology, RAT, and/or frequency selection; and
   send the determined information from the CN node to the RAN node.

2. The CN node of claim 1 wherein the CN node comprises one of an Authentication Management Function, AMF, a Session Management Function, SMF, a Mobility Management Entity, MME, or a Home Subscriber Server, HSS.

3. The CN node of claim 1 wherein the knowledge of network slices comprises knowledge of:
   availability of network slices at a network;
   active slices for a User Equipment, UE;
   slices to which the UE is registered or connected; and/or
   slices to which the UE is allowed access based on subscription information.

4. The CN node claim 1 wherein the determined information for the RAT and/or frequency selection comprises an index parameter.

5. The CN node of claim 4 wherein the index parameter comprises a RAT and/or Frequency Selection Priority, RFSP, index.

6. The CN node of claim 1 wherein the knowledge of network slices is provided to the CN node from the UE, the RAN node, or other node.

7. The CN node of claim 1 wherein the determined information for the RAT and/or frequency selection comprises information used to control a frequency on which the UE camps.

8. The CN node of claim 1 wherein the determined information for the RAT and/or frequency selection comprises information used to configure frequency priorities for idle mode reselection.

9. A method implemented in a Core Network, CN, node, the method comprising:
   determining, based on knowledge of network slices associated with a User Equipment, UE, information for Radio Access Technology, RAT, and/or frequency selection; and
   sending the determined information from the CN node to a Radio Access Network, RAN, node.

10. The method of claim 9 wherein the CN node comprises one of an Authentication Management Function, AMF, a Session Management Function, SMF, a Mobility Management Entity, MME, or a Home Subscriber Server, HSS.

11. The method of claim 9 wherein the knowledge of network slices comprises knowledge of:
   availability of network slices at a network;
   active slices for a User Equipment, UE;
   slices to which the UE is registered or connected; and/or
   slices to which the UE is allowed access based on subscription information.

12. The method of claim 9 wherein the determined information for RAT and/or frequency selection comprises an index parameter.

13. The method of claim 12 wherein the index parameter comprises a RAT and/or Frequency Selection Priority, RFSP, index.

14. The method of claim 9 wherein the knowledge of network slices is provided to the CN node from the UE, the RAN node, or other node.

15. The method of claim 9 wherein the determined information for the RAT and/or frequency selection comprises information used to control a frequency on which the UE camps.

16. The method of claim 9 wherein the determined information for the RAT and/or frequency selection comprises information used to configure frequency priorities for idle mode reselection.

* * * * *